Feb. 7, 1967     F. A. LANE     3,302,471

POWER TRANSMISSION UNIT

Filed Oct. 19, 1964     2 Sheets-Sheet 1

INVENTOR.
FRED A. LANE
BY
Hood, Gust & Irish
Attorneys

INVENTOR.
FRED A. LANE

_United States Patent Office_

3,302,471
Patented Feb. 7, 1967

3,302,471
POWER TRANSMISSION UNIT
Fred A. Lane, 1113 Little Creek Drive,
Harlingen, Tex. 76554
Filed Oct. 19, 1964, Ser. No. 404,568
7 Claims. (Cl. 74—63)

The present invention relates to a power transmission unit, and more particularly to a device through which input power may be applied to drive a load at a speed ratio dependent upon the magnitude of the torque resistance of the load. The primary object of the invention is to provide a transmission unit which, without the use of gears, sprockets, springs, valves or external fluid pressure supply, will automatically select the drive speed ratio most advantageous for the load torque resistance encountered by the unit.

Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

FIG. 1 is a longitudinal, axial section through a preferred embodiment of my invention;

FIG. 3 is a central section through a modified form of piston and cylinder which may be used in connection with my invention.

Figures 2, 4:
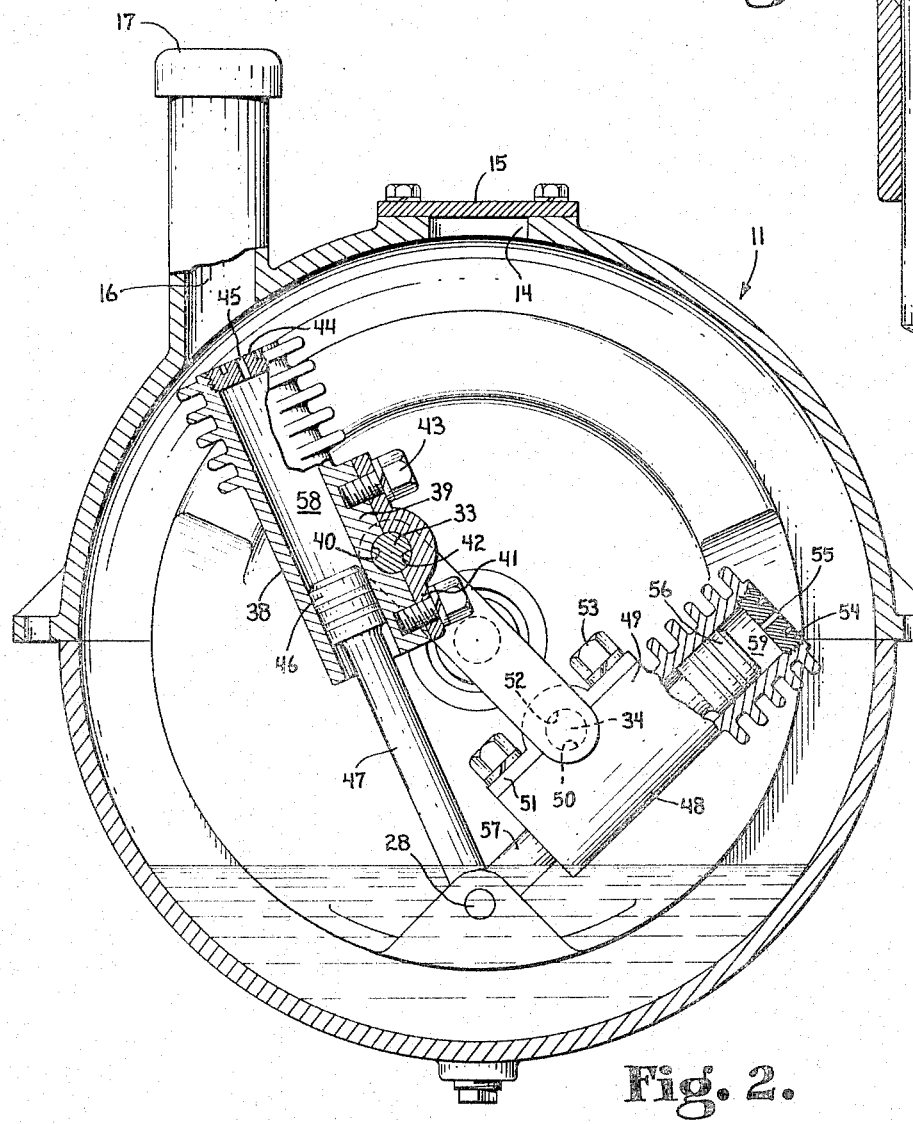
FIG. 2 is a transverse section thereof, taken substantially on the line 2—2 of FIG. 1 and showing the parts in a different relationship.
FIG. 4 is a similar section through a still further form of slide and guide means which, in certain environments, may be used in my invention.

Referring more particularly to FIGS. 1 and 2, it will be seen that I have illustrated a case indicated generally by the reference numeral 10 and, in the illustrated embodiment, comprising a shell 11 and a cover 12 cooperative to define a chamber 13 having a filling opening 14 closed by a plate 15 and having an upstanding breather stack 16 provided with a conventional breather cap 17.

As shown, the shell 11 is formed to provide a central neck 18 having an axial bore 19 formed to accommodate antifriction bearings 20 and 21 in which is journalled a first shaft 22. A closure cap 23 for the neck 18 carries suitable packing means 24 which may be of conventional construction.

Within the chamber 13, the shaft 22 supports a discoid carrier 25 which, as shown, may be integral with said shaft. At one point in its periphery, the carrier 25 is provided with an arm 26 extending toward the cover 12 and radially offset from the axis of the shaft 22. The carrier 25 will be provided with suitable counter-weighting (not specifically shown) to compensate for the arm 26 and its associated parts so that the carrier will be substantially balanced both statically and dynamically.

Pairs of ears 27 project radially inwardly from the arm 26 to support trunnion means 28 for a purpose which will become apparent.

The cover 12 is formed to provide a neck 29 in which are mounted anti-friction bearing means 30 and suitable sealing means 31; and a second shaft 32 penetrates the cover and is journal supported in said bearing means 30, the shaft 32 being coaxial with the shaft 22. Within the chamber 13, the shaft 32 is provided with a plurality of crank sections. In the illustrated embodiment of the invention, said shaft is formed to provide two crank sections 33 and 34 which are equally and diametrically oppositely radially offset from the common axis of the shafts 22 and 32; and the shaft 32 ends in a coaxial section 35 which is journal mounted in an anti-friction bearing 36 supported in a coaxial socket 37 in the inner face of the carrier 25. If the shaft 32 is provided with more than two crank sections, those sections will preferably be equally offset radially from the shaft axis and equiangularly peripherally spaced about the shaft axis. As is clearly to be seen in the drawings, the radial offsetting of the crank sections is less than the radial offsetting of the arm 26, and the arm 26 overlaps both crank sections 33 and 34.

Guide means which, in the form of invention illustrated in FIGS. 1 and 2, a cylinder 38 is formed near one end with a lateral base 39 having a transaxial groove 40 for receiving the crank section 33; and a cap 41 having a similar groove 42 is secured to the base 39 by means of screws 43 or other equivalent fastening means, whereby the cylinder 38 is mounted for rotation bodily about the axis of the crank section 33 with the longitudinal axis of the cylinder radially offset from the crank section axis and generally transaxially arranged with respect to the crank section. One end of the cylinder 38 receives a removable plug 44 provided with a port 45 of predetermined flow capacity; and it is to be understood that the plug 44 may be replaced by another plug having a port of different predetermined flow capacity.

Snugly fitting within the cylinder 38 and reciprocable therein is a piston 46 having a stem 47 extending through the opposite end of the cylinder and journal mounted, at its proximal end, upon the trunnion 28.

Similarly, a cylinder 48 is provided with a lateral base 49 having a transverse groove 50 adapted to fit the crank section 34. A cap 51 provided with a similar groove 52 is secured to the base 49 by screws 53 or the like, with the grooves 50 and 52 mating to mount the cylinder 48 for rotation about the axis of the crank section 34. One end of the cylinder 48 receives a plug 54 like the plug 44 and provided with a port 55 of predetermined flow capacity; and a piston 56 like the piston 46 is similarly received in the cylinder 48 and is provided with a stem 57 whose proximal end is journal mounted on the trunnion element 28.

It will be seen that the pistons 46 and 56 cooperate with their respective cylinders 38 and 48 to define variable-volume chambers 58 and 59, each piston defining a movable wall of its respective variable-volume chamber; and it will be seen that each such variable-volume chamber communicates with the chamber 13 only through its port 45 or 55.

Accordingly to the preferred embodiment of my invention, the chamber 13 will be substantially filled with a liquid of selected viscosity so that the cylinders 38 and 48 will always be substantially immersed in the liquid. If, now, power is applied to rotate the shaft 22 in either direction as viewed in FIG. 2, power will be transmitted, through the piston-and-cylinder sets, to the crank sections 33 and 34 of the shaft 32. With the parts in the positions illustrated in FIG. 2, the chamber 58 will be almost full of liquid and the chamber 59 will be almost empty. If, now, the carrier 25 is turned in a clockwise direction while the shaft 32 is under no load, the movement of the trunnion element 28 will tend to retract the piston 56 in the cylinder 48 to enlarge the chamber 59 and to project the piston 46 to reduce the volume of the chamber 58; but such movement of the pistons relatively to their cylinders will be resisted by the flow resistance of the ports 45 and 55, and therefore the cylinders 38 and 48 will follow the trunnion element 28 and, maintaining their illustrated angular relationships to the respective crank sections, enforce rotation of the shaft 32 synchronously with the shaft 22.

If, however, the shaft 32 is under any load, it will resist rotation sufficiently to permit reciprocation of the pistons 46 and 56, with consequent flow of liquid through the ports 45 and 55 and movement of the pistons 46 and 56 in their respective cylinders. Because of the flow resistance of the port 55, the piston 56 will exert a pulling force through its cylinder 48 upon the crank section 34 in a direction substantially tangential to the path of movement of said crank section, when the parts are in their positions illustrated in FIG. 2. At the same time, the piston 46 will exert a pushing force upon the crank section 33; and while only a minor component of that force is tangential to the path of movement of the crank section 33 when the parts are in their illustrated positions, it will be seen that, since the velocity of the trunnion element 28 somewhat exceeds that of the shaft 32, the cylinder 38 will turn in a clockwise direction about the axis of the crank section 33 whereby the tangential component of that force will gradually increase. At the same time, the cylinder 48 will turn about the axis of the crank section 34 and the tangential component of the pulling force upon the section 34 will be decreased.

Since the resistance to piston movement relative to their respective cylinders is determined by the flow capacities of the ports 45 and 55, and by the viscosity of the liquid in the chamber 13, it will be evident that the ratio between the velocities of the shafts 22 and 32 will be automatically determined by the torque resistance of the load upon the shaft 32. If the system is started under given load conditions, the shaft 22 will at first turn rapidly with the cylinders rotating about their respective crank sections, and the load will be picked up gradually until the optimum ratio becomes established. If, during operation, the load is increased, the velocity of the shaft 32 will tend to decrease and may drop momentarily below an optimum value, but will seek and ultimately settle into such optimum value. Similarly, if the load should decrease during operation, the velocity of the shaft 32 will accelerate automatically to an optimum value. Of course, in the above discussion, it is assumed that the shaft 22 is being driven from an external source at a constant velocity.

In some installations, it may be advantageous to use the displacement type of piston illustrated in FIG. 3. Thus, a cylinder generally of the type indicated by the reference numeral 60 may be substituted for each of the cylinders 38 and 48. As shown, one end of the cylinder 60 is proportioned and designed snugly to receive the piston 62 which is of uniform diameter throughout its length, suitable packing means being provided to establish a fluid seal. The opposite end of the cylinder 60 receives a plug 63 having a port 64 of predetermined flow capacity, thereby defining a chamber 65 whose effective volume is variable in accordance with the degree of projection thereinto of the piston 62 whose diameter is significantly smaller than the diameter of the chamber 65. The operation of the transmission unit including cylinder-and-piston assemblies of the character illustrated in FIG. 3 will be substantially identical with the operation of the assembly illustrated in FIGS. 1 and 2, as described above.

It will be apparent that the transmission unit disclosed herein is operative whether the fluid in the chambers 58, 59 or 65 is liquid or gas. Obviously, the efficiency of power transmission of a system in which gas is utilized is less than that of a system utlizing liquid, because of the compressibility of gas; but the ports 45, 55 or 64 may be so designed as to provide for transmission of power of significant magnitude, even where gas is used in the system.

It will also be apparent that some power can be transmitted, generally in the same manner, even by a system in which the cylinder-and-piston assemblies are replaced by guide-and-slide assemblies of the type illustrated in FIG. 4. As shown, such an assembly consists of a sleeve 66 in which a plunger 67 is reciprocably guided for movement under predetermined resistance. If, for instance, such an assembly is immersed in a liquid of relatively high viscosity, relative reciprocation between the plunger 67 and the guide 66 will be sufficient to transmit some power between the carrier 25 and the crank shaft 32.

It will be obvious, of course, that the power transmission of the system disclosed in FIGS. 1 to 3 may be varied by selection of plugs having ports of various flow capacities and by selection of fluids of various viscosities for immersing the relatively-reciprocatory parts.

I claim as my invention:

1. A power transmission unit comprising a first shaft journaled for rotation on an axis, a crank shaft coaxial with said first shaft and journalled for rotation at velocities independent of the velocity of said first shaft, said crank shaft having a plurality of crank sections axially and peripherally spaced from each other, guide means journalled from each crank section for rotation about the axis of such crank section, each guide means having a longitudinal axis which is transverse relative to the axis of its associated crank section, journal means carried by said first shaft upon a single axis parallel with, but radially offset relative to, the common axis of said shafts, and overlapping all of said crank sections, and slide means received in each guide means for axial reciprocation therein against predetermined resistance, each slide means being connected to said journal means for oscillation about the axis of said journal means.

2. A power transmission unit comprising a first shaft journalled for rotation on an axis, a crank shaft coaxial with said first shaft and journalled for rotation at velocities independent of the velocity of said first shaft, said crank shaft having a plurality of crank sections axially and peripherally spaced from each other, a cylinder for each crank section, each cylinder having an axis which is transverse relative to the axis of its crank section and radially spaced from said crank section and each cylinder being journalled intermediate its ends for bodily rotation about the axis of its crank section, means providing a flow-restricting port controlling fluid flow from one end of each cylinder, journal means carried by said first shaft upon a single axis parallel with, but radially offset relative to, the common axis of said shafts, and overlapping all of said crank sections, a piston reciprocably mounted in each cylinder, and a piston rod for each piston connected to said journal means for oscillation about the axis of said journal means.

3. A power transmission unit comprising a case formed to provide a chamber adapted to be substantially filled with liquid, a first shaft journalled in and penetrating a wall of said case, a carrier fixed to rotate with said shaft and disposed within said chamber, journal means supported from said carrier within said chamber and disposed on a single axis parallel with but radially offset from the axis of said shaft, a second shaft journalled in and penetrating a wall of said case opposite said first-named wall and coaxial with said first shaft, said second shaft having a plurality of crank sections within said chamber, said crank sections providing peripherally-spaced axes parallel with but radially offset from the common axis of said shafts to an extent less than the radial offset of siad journal means and said journal means overlapping all of said crank sections, guide means for each crank section, each guide means being journalled for rotation about the axis of its crank section and having a longitudinal dimension radially offset from, and generally transaxial relative to, its crank section axis, slide means reciprocably guided in each guide means, and means connecting each slide means for oscillation about the axis of said journal means.

4. The power transmission unit of claim 3 in which said guide means is always substantially immersed in a liquid of predetermined viscosity in said chamber, said chamber being provided with an upstanding breather stack.

5. The power transmission unit of claim 3 in which each guide means is a cylinder provided adjacent one end with a flow-restricting port, and in which each slide means is a piston movable in its cylinder toward and away from said one end to define with its cylinder a variable-volume chamber communicating with said first-named chamber only through said port.

6. The power transmission unit of claim 5 in which each piston snugly fits the wall of its cylinder and constitutes a movable end wall of its variable-volume chamber.

7. The power transmission unit of claim 5 in which each piston has a diameter less than the diameter of its associated cylinder and enters its cylinder through a fluid-sealing portal.

References Cited by the Examiner

UNITED STATES PATENTS

| | | | |
|---|---|---|---|
| 1,904,530 | 4/1933 | Rathbun | 74—63 |
| 2,386,459 | 10/1945 | Hautzenroeder | 192—60 |
| 2,743,627 | 5/1956 | Christenson | 74—606 |

FOREIGN PATENTS 388,045    5/1908    Germany.

FRED C. MATTERN, Jr., *Primary Examiner.*

F. E. BAKER, *Assistant Examiner.*